US010330241B2

(12) United States Patent
Smed

(10) Patent No.: US 10,330,241 B2
(45) Date of Patent: *Jun. 25, 2019

(54) ADJUSTABLE MOUNTING PLATE ASSEMBLY

(71) Applicant: Ole Falk Smed, Calgary (CA)

(72) Inventor: Ole Falk Smed, Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/789,822

(22) Filed: Oct. 20, 2017

(65) Prior Publication Data

US 2018/0039219 A1 Feb. 8, 2018

Related U.S. Application Data

(63) Continuation of application No. 15/363,781, filed on Nov. 29, 2016, now Pat. No. 9,797,544.

(51) Int. Cl.
*F16M 11/06* (2006.01)
*F16M 11/08* (2006.01)
*F16M 11/10* (2006.01)
*F16M 11/20* (2006.01)
*F16M 13/02* (2006.01)
*F21V 21/26* (2006.01)
*F21V 21/34* (2006.01)

(52) U.S. Cl.
CPC ............. *F16M 11/06* (2013.01); *F16M 11/08* (2013.01); *F16M 11/10* (2013.01); *F16M 11/2085* (2013.01); *F16M 13/022* (2013.01); *A47B 2200/0085* (2013.01); *F16M 2200/027* (2013.01); *F21V 21/26* (2013.01); *F21V 21/34* (2013.01)

(58) Field of Classification Search
CPC ........ F16M 11/06; F16M 11/08; F16M 11/10; F16M 11/2085; F16M 13/022; F16M 2200/027; A47B 2200/0085; F21V 21/26; F21V 21/34
See application file for complete search history.

(56) References Cited

U.S. PATENT DOCUMENTS

| 7,048,242 | B2 * | 5/2006 | Oddsen, Jr. | F16M 11/10 248/279.1 |
|---|---|---|---|---|
| 8,757,569 | B2 * | 6/2014 | Chen | F16M 11/045 248/223.41 |
| 8,827,226 | B2 * | 9/2014 | Townsend | F16M 11/10 220/3.5 |
| 9,178,347 | B2 * | 11/2015 | Myers | F16M 11/10 |
| 9,228,693 | B2 * | 1/2016 | Ditges | F16M 11/24 |
| 2012/0144760 | A1 * | 6/2012 | Schaefer | E04C 3/06 52/58 |

(Continued)

*Primary Examiner* — Rodney A Bonnette
(74) *Attorney, Agent, or Firm* — Carl A. Hjort, III

(57) ABSTRACT

An assembly including a channel track for engagement with the surface of a desk, having a generally flat bottom surface, a hollow interior portion and a slot extending the entire length of the channel track; at least two hubs, having a coupling with a bushing for receiving an office accessory; at least two plate nuts disposed in the hollow interior portion of the channel track, and wherein each hub is secured to a corresponding plate nut by a bolt which extends through the hub, through the slot in the channel track and into engagement with the corresponding plate nut; and either a bolt or clamp member for securing the channel track to the desk.

10 Claims, 2 Drawing Sheets

(56) References Cited

U.S. PATENT DOCUMENTS

2013/0320170 A1* 12/2013 Smed ..................... F16M 11/10
                                                          248/274.1
2014/0117182 A1*  5/2014 Blackburn ............. F16M 11/18
                                                          248/298.1

* cited by examiner

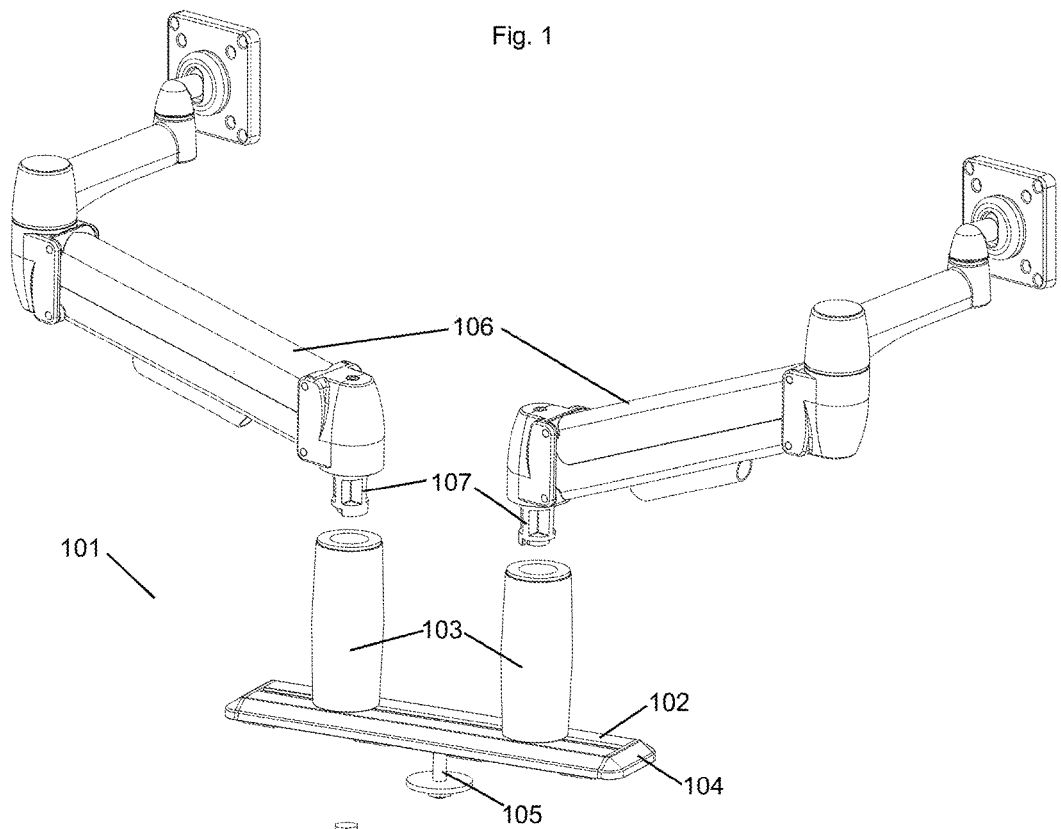
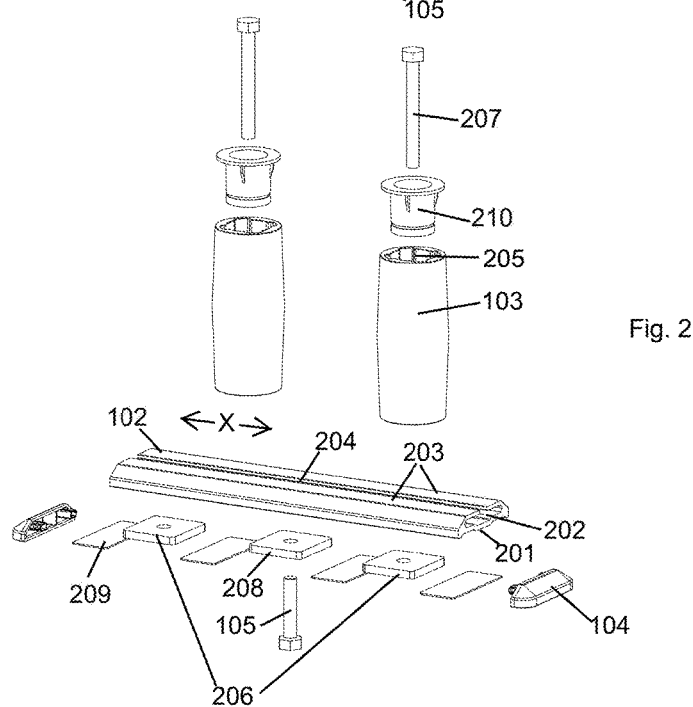

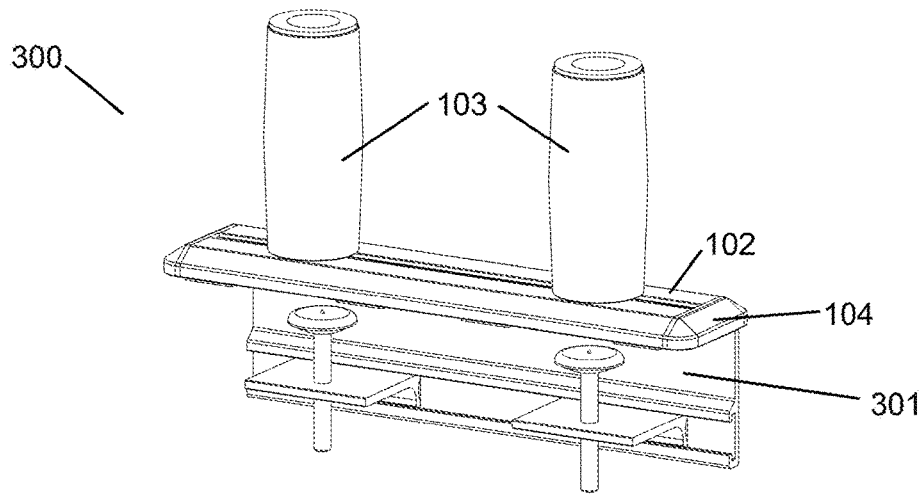
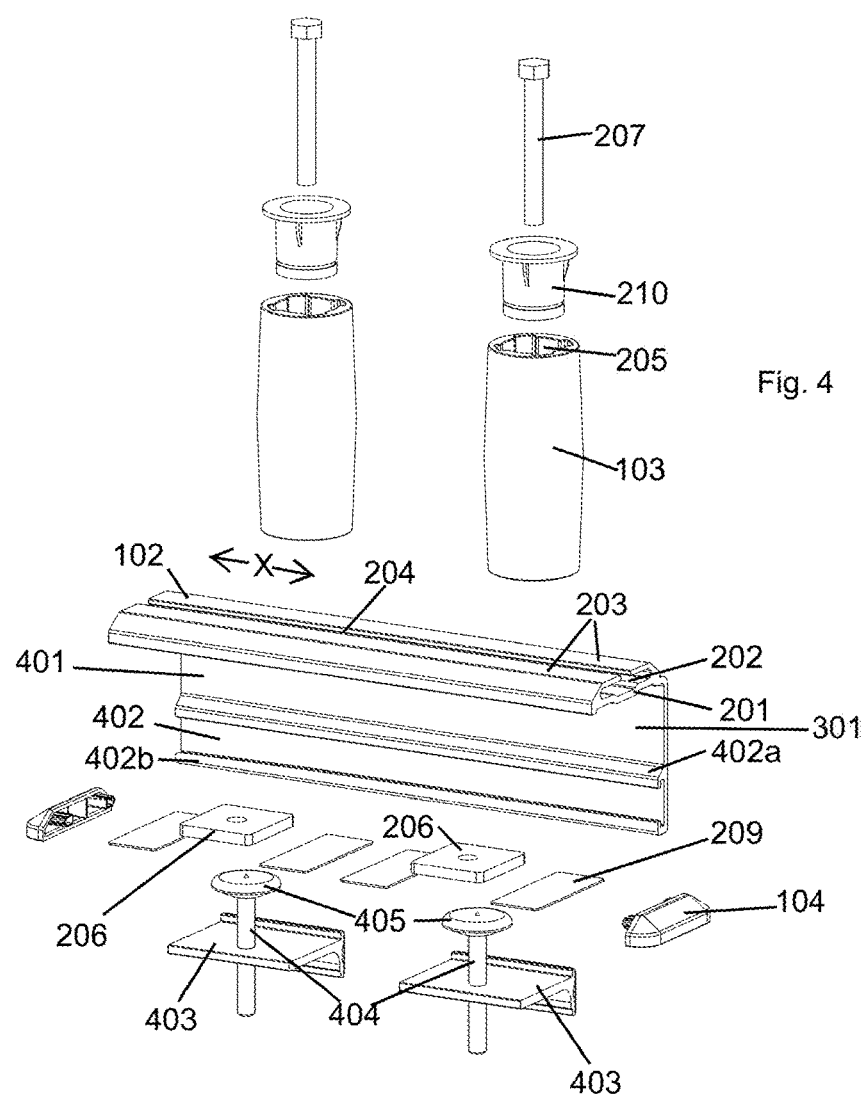

ADJUSTABLE MOUNTING PLATE ASSEMBLY

CROSS-REFERENCE TO RELATED APPLICATIONS

The present application is a continuation of U.S. application Ser. No. 15/363,781 filed Nov. 29, 2016, now U.S. Pat. No. 9,797,544 having the same title, and which is incorporated herein by this reference.

BRIEF DESCRIPTION OF THE DRAWINGS

FIG. 1 is a partially-exploded view of a first embodiment of the adjustable mounting plate assembly.

FIG. 2 is an exploded view of a first embodiment of the adjustable mounting plate assembly.

FIG. 3 is an assembled view of a second embodiment of the adjustable mounting plate assembly.

FIG. 4 is an exploded view of a second embodiment of the adjustable mounting plate assembly.

DETAILED DESCRIPTION OF THE DRAWINGS

Embodiments of an adjustable mounting plate assembly are shown and described. In a first embodiment, the adjustable mounting plate assembly includes a channel track for engagement with the surface of a desk, said channel track having a generally flat bottom surface, a hollow interior portion with a generally rectangular cross section defined by the flat bottom surface and two upper members extending from the flat bottom surface, and a slot extending the entire length of the channel track, said slot defined by the ends of the two upper members and allowing for communication into the hollow interior portion; at least two hubs, said hubs having a coupling with a bushing for receiving an office accessory; at least two plate nuts, said number of plate nuts corresponding to the number of hubs in the assembly, said plate nuts disposed in the hollow interior portion of the channel track, and wherein each hub is secured to a corresponding plate nut by a bolt which extends through the hub, through the slot in the channel track and into engagement with the corresponding plate nut, wherein when the plate nuts and connected hubs are loosely connected, the plate nuts and connected hubs are free to slide in the slot in the direction of the length of the channel track and when the plate nuts and connected hubs are tightly connected, the plate nuts and connected hubs are retained in their position in the slot without any sliding movement; wherein said channel track further comprises endcaps disposed on each end of the channel track to prevent the plate nuts from sliding out of the hollow interior portion of the channel track; and wherein the channel track is provided with a through-hole in the flat bottom surface, said hole allowing a bolt to engage an additional plate nut disposed in the hollow interior portion thereby securing the channel track to the desk.

In a second embodiment, the adjustable mounting plate assembly includes a channel track for engagement with the surface of a desk, said channel track having a generally flat bottom surface, a hollow interior portion with a generally rectangular cross section defined by the flat bottom surface and two upper members extending from the flat bottom surface, and a slot extending the entire length of the channel track, said slot defined by the ends of the two upper members and allowing for communication into the hollow interior portion; at least two hubs, said hubs having a coupling with a bushing for receiving an office accessory; at least two plate nuts, said number of plate nuts corresponding to the number of hubs in the assembly, said plate nuts disposed in the hollow interior portion of the channel track, and wherein each hub is secured to a corresponding plate nut by a bolt which extends through the hub, through the slot in the channel track and into engagement with the corresponding plate nut, wherein when the plate nuts and connected hubs are loosely connected, the plate nuts and connected hubs are free to slide in the slot in the direction of the length of the channel track and when the plate nuts and connected hubs are tightly connected, the plate nuts and connected hubs are retained in their position in the slot without any sliding movement; wherein said channel track further comprises endcaps disposed on each end of the channel track to prevent the plate nuts from sliding out of the hollow interior portion of the channel track; and wherein the channel track is further provided with a underdesk clamping portion, extending perpendicularly from the flat bottom surface, wherein said underdesk clamping portion further comprises a clamp track, and at least one slidable clamp disposed in the clamp track, said slidable clamps having an adjustable screw and a clamp pad for clamping the channel track to the desk.

FIGS. 1 and 2 show a first embodiment of the adjustable mounting plate assembly 101. FIG. 1 is a partially exploded view, while FIG. 2 is an exploded view. The same numerals will be used to identify elements common to FIGS. 1 and 2. Thus, FIG. 1 shows a channel track 102 for engagement with the surface of a desk (not shown), One of ordinary skill will appreciate that the channel track 102 may be extruded in one piece or it may consist of multiple pieces joined together by any means known to the art. Further, the channel track 102 may be formed from a material such as steel or aluminum. Also shown in FIG. 1 are the hubs 103, the endcaps 104 and the mounting bolt 105 with optional washer. Hubs 103 may receive arms for supporting computer monitors. Alternatively, hubs 103 may receive a mount for a desktop lamp. The endcaps 104 are disposed on each end of the channel track 102 to prevent the plate nuts (described below) from sliding out of the hollow interior portion (described below) of the channel track 102.

The partially-exploded view of FIG. 1 shows the installation of office accessories on the assembly. As can be seen in FIG. 1, adjustable monitor arms 106 are provided with a shaft 107 to engage in the coupling with the bushing (described below) disposed in the hub 103. It should be appreciated that adjustable monitor arms are not the only office accessories that may be mounted in the hubs 103. Alternatively, mounts for desktop lights (not shown) could be mounted in the hubs 103.

As can be more clearly seen in FIG. 2, the channel track 102 has a generally flat bottom surface 201, a hollow interior portion 202 with a generally rectangular cross section defined by the flat bottom surface 201 and two upper members 203 extending from the flat bottom surface 201, and a slot 204 extending the entire length of the channel track, the slot 204 defined by the ends of the two upper members 203 and allowing for communication into the hollow interior portion 202. Also visible in FIG. 2 are the two hubs 103, each of the hubs 103 having a coupling 205 with a bushing 210 disposed therein. The coupling 205 and bushing 210 receive an office accessory as discussed above. Bushing 210 allows for the free rotation of the shaft 107 of adjustable monitor arm 106 in coupling 205.

FIG. 2 also show the two plate nuts 206. The number of plate nuts 206 corresponds to the number of hubs 103 in the assembly. For example FIG. 2 shows an assembly with two hubs and two plate nuts. If the assembly instead included three hubs, three plate nuts would be also have to be included in the assembly. The plate nuts 206 are disposed in the hollow interior portion 202 of the channel track 102. Each hub 103 is secured to the corresponding plate nut 206 by a bolt 207 which extends through the hub 103, through the slot 204 in the channel track 102 and into engagement with the corresponding plate nut 206. When the plate nuts 206 and connected hubs 103 are loosely connected, the plate nuts 206 and connected hubs 103 are free to slide in the slot 204 in the direction of the length of the channel track 102, i.e. in the direction defined by the axis labelled "X" in FIG. 2. When the plate nuts 206 and connected hubs 103 are tightly connected, the plate nuts 206 and connected hubs 103 are retained in their position in the slot 204 without any sliding movement.

FIG. 2 also illustrates the mechanism of attachment of the channel track 102 to the desk. The channel track 102 is provided with a through-hole (not shown) in the flat bottom surface 201, said through-hole allowing bolt 105 to engage an additional plate nut 208 disposed in the hollow interior portion 202 thereby securing the channel track 102 to the desk. Finally, also shown in FIG. 2 are pads 209 on the bottom surface of channel track 102 to prevent damage to the surface of the desk when the assembly is engaged with the desk FIGS. 3 and 4 show a second embodiment of the adjustable mounting plate assembly 300. FIG. 3 is an assembled view, while FIG. 4 is an exploded view. Many of the elements shown in FIGS. 3 and 4 are the same as the elements shown in the FIGS. 1 and 2 and the same numerals will be used to identify elements already shown in FIGS. 1 and 2. Thus, FIG. 3 shows a channel track 102 for engagement with the surface of a desk (not shown). One of ordinary skill will appreciate that the channel track 102 may be extruded in one piece or it may consist of multiple pieces joined together by any means known to the art. Further, the channel track 102 may be formed from a material such as steel or aluminum. Also shown in FIG. 3 are the hubs 103, the endcaps 104. As discussed above with reference to FIG. 1, hubs 103 may receive arms for supporting computer monitors. Alternatively, hubs 103 may receive a mount for a desktop lamp. The endcaps 104 are disposed on each end of the channel track 102 to prevent the plate nuts from sliding out of the hollow interior portion of the channel track 102. FIG. 3 also shows the clamp assembly 301, which will be discussed in greater detail in the discussion of FIG. 4.

As can be more clearly seen in FIG. 4, the channel track 102 has a generally flat bottom surface 201, a hollow interior portion 202 with a generally rectangular cross section defined by the flat bottom surface 201 and two upper members 203 extending from the flat bottom surface 201, and a slot 204 extending the entire length of the channel track, the slot 204 defined by the ends of the two upper members 203 and allowing for communication into the hollow interior portion 202. Also visible in FIG. 4 are the two hubs 103, each of the hubs 103 having a coupling 205 with a bushing 210 disposed therein. The coupling 205 and bushing 210 receive an office accessory as was disclosed in the discussion of FIG. 1.

FIG. 4 also show the two plate nuts 206. The number of plate nuts 206 corresponds to the number of hubs 103 in the assembly. For example FIG. 4 shows an assembly with two hubs and two plate nuts. If the assembly instead included three hubs, three plate nuts would be also have to be included in the assembly. The plate nuts 206 are disposed in the hollow interior portion 202 of the channel track 102. Each hub 103 is secured to the corresponding plate nut 206 by a bolt 207 which extends through the hub 103, through the slot 204 in the channel track 102 and into engagement with the corresponding plate nut 206. When the plate nuts 206 and connected hubs 103 are loosely connected, the plate nuts 206 and connected hubs 103 are free to slide in the slot 204 in the direction of the length of the channel track 102, i.e. in the direction defined by the axis labelled "X" in FIG. 2. When the plate nuts 206 and connected hubs 103 are tightly connected, the plate nuts 206 and connected hubs 103 are retained in their position in the slot 204 without any sliding movement.

FIG. 4 also illustrates the alternative embodiment for the mechanism of attachment of the channel track 102 to the desk, that is clamp assembly 301. The channel track 102 is provided with an underdesk clamping portion 401, extending perpendicularly from the flat bottom surface 201. The underdesk clamping portion 401 further comprises a clamp track 402. Clamp track 402 is defined by track members 402a and 402b. At least one slidable clamp 403 disposed in the clamp track 402. As can be seen in FIG. 4, two slidable clamps 403 are provided, but more or less could be provided if necessary depending on the requirements for the installation. Each slidable clamp 403 has an adjustable screw 404 and a clamp pad 405 for clamping the channel track 102 to the desk. In operation, the adjustable screw 404 is tightened to bias clamp pad 405 against the underside of the desk surface, thereby clamping the channel track 102 in place.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

The invention claimed is:

1. An adjustable mounting plate assembly comprising:
a channel means for engagement with a surface of a desk;
a plurality of hub means for receiving an office accessory:
a plurality of plate nut means for retaining the hub means in connection with the channel means;
and means for securing the channel means to the desk.

2. The adjustable mounting plate assembly of claim 1, wherein arms for supporting computer monitors are disposed in a coupling with a bushing provided in the hub means.

3. The adjustable mounting plate assembly of claim 1, wherein the channel means is extruded in one piece.

4. The adjustable mounting plate assembly of claim 1, wherein the channel means is comprised of multiple pieces joined together.

5. The adjustable mounting plate assembly of claim 1, further comprising a plurality of endcap means for preventing the plate nuts means from sliding out of engagement with the channel means.

6. The adjustable mounting plate assembly of claim 1, wherein the channel means is provided with pads on its bottom surface to prevent damage to the surface of the desk when the assembly is engaged with the desk.

7. The adjustable mounting plate assembly of claim 1, wherein the channel means is formed from a material selected from the group consisting of steel and aluminum.

8. The adjustable mounting plate of claim 1, wherein a mount for a desktop lamp is disposed in the hub means.

9. The adjustable mounting plate of claim 1, wherein the means for securing the channel means to the desk is a through-hole in the channel means said hole allowing a bolt to engage a plate nut disposed inside the channel means thereby securing the channel means to the desk.

10. The adjustable mounting plate of claim 1, wherein the means ring the channel means to the desk is an under-desk clamping means for clamping the channel track to the desk.

\* \* \* \* \*